United States Patent
Fukuda

(10) Patent No.: US 10,362,659 B2
(45) Date of Patent: Jul. 23, 2019

(54) ILLUMINATION CONTROL SYSTEM, LIGHTING SYSTEM, ILLUMINATION SYSTEM, NON-TRANSITORY RECORDING MEDIUM, AND ILLUMINATION CONTROL METHOD

(71) Applicant: Panasonic Intellectual Property Management Co., Ltd., Osaka (JP)

(72) Inventor: Kenichi Fukuda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/134,698

(22) Filed: Sep. 18, 2018

(65) Prior Publication Data

US 2019/0098730 A1 Mar. 28, 2019

(30) Foreign Application Priority Data

Sep. 25, 2017 (JP) ................................. 2017-184108

(51) Int. Cl.
*H05B 37/02* (2006.01)
*H05B 33/08* (2006.01)

(52) U.S. Cl.
CPC ..... *H05B 37/0227* (2013.01); *H05B 33/0863* (2013.01); *H05B 37/0281* (2013.01); *H05B 33/0815* (2013.01)

(58) Field of Classification Search
CPC .............. H05B 33/0872; H05B 33/086; H05B 33/0812; H05B 33/0845; H05B 33/0827; H05B 33/0857; H05B 33/083; H05B 33/0863; H05B 33/0815; H05B 37/0227; H05B 37/0281; H01H 9/16; F21V 33/004; F21Y 2115/10

See application file for complete search history.

(56) References Cited

U.S. PATENT DOCUMENTS

2006/0012315 A1* 1/2006 McDonough ...... H05B 37/0209
315/291

FOREIGN PATENT DOCUMENTS

JP 2015-133249 A 7/2015

* cited by examiner

*Primary Examiner* — Tung X Le
*Assistant Examiner* — Henry Luong
(74) *Attorney, Agent, or Firm* — Renner, Otto, Boisselle & Sklar, LLP

(57) ABSTRACT

An illumination control system includes a manipulation detector and an electric power controller. The electric power controller stops supply of electric power to a plurality of lighting apparatuses when an OFF manipulation is detected. The electric power controller starts the supply of the electric power to the lighting apparatuses when an ON manipulation is detected after detection of the OFF manipulation and before a first timing, or when the ON manipulation is detected at or after a second timing. The first timing is a timing at which a threshold time which is predetermined has elapsed since the detection of the OFF manipulation. The second timing is a timing at which a predetermined forced interruption time has elapsed since the first timing.

17 Claims, 7 Drawing Sheets

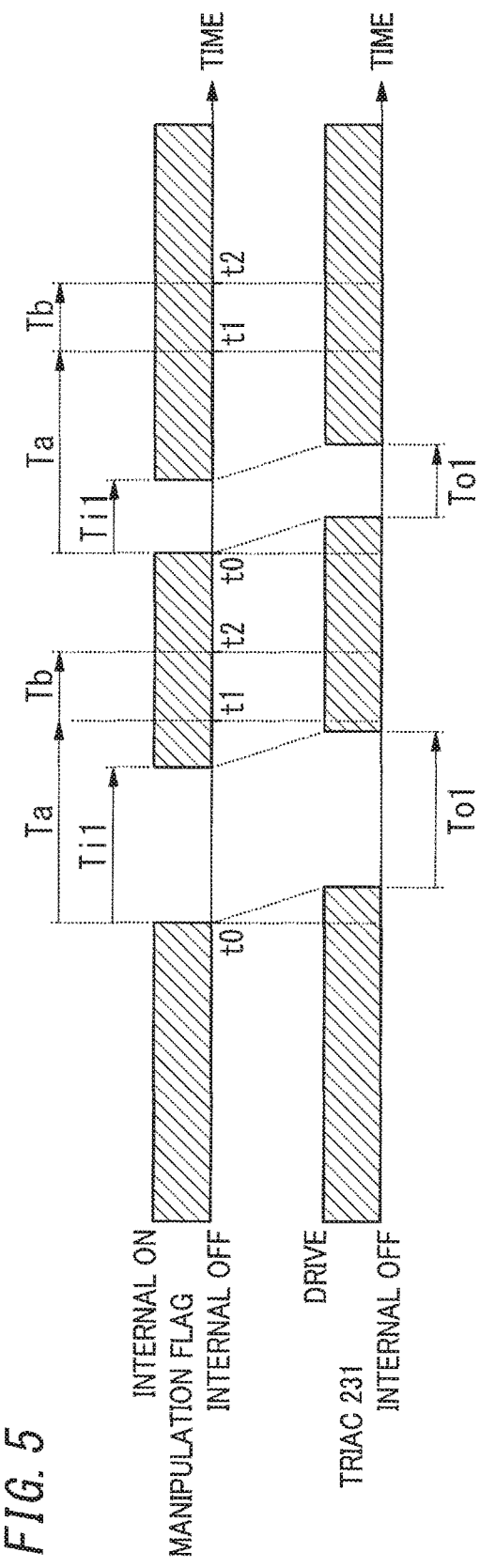
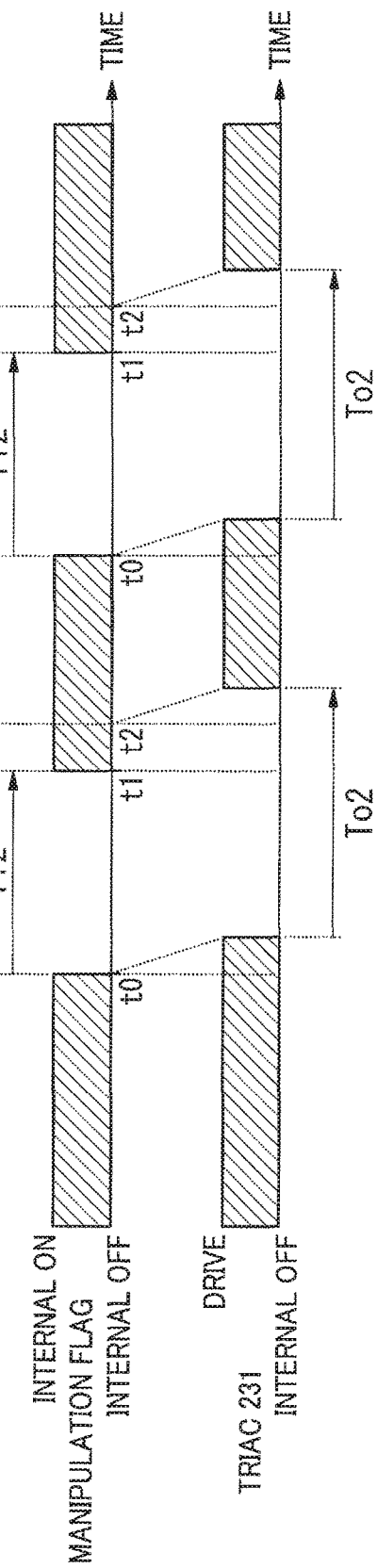

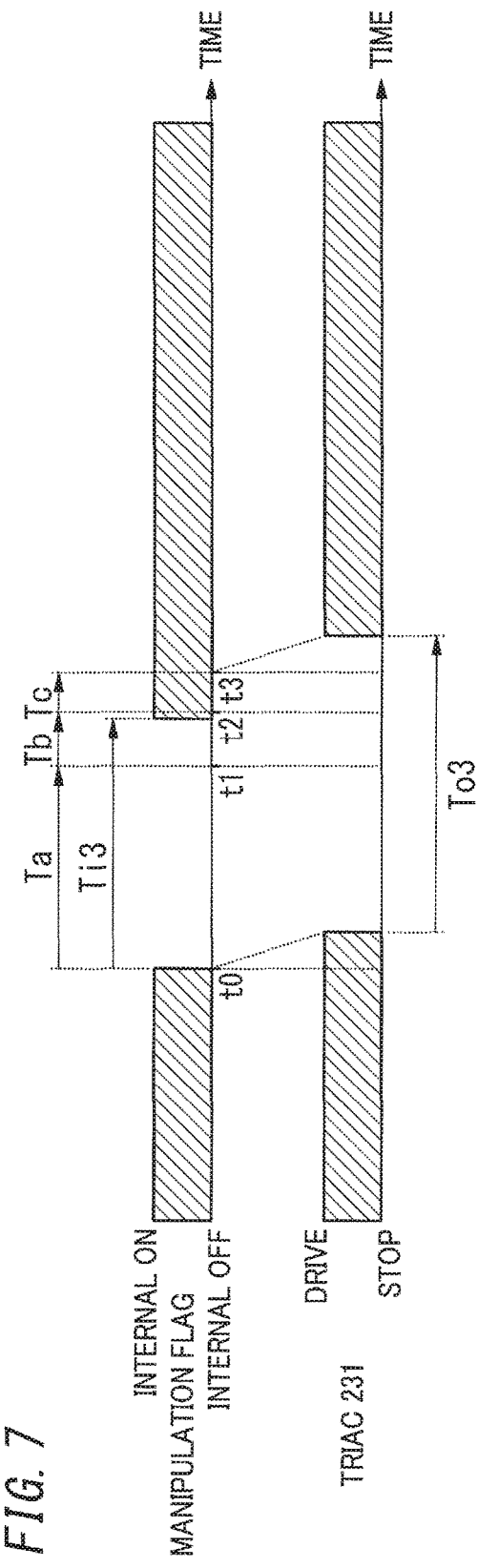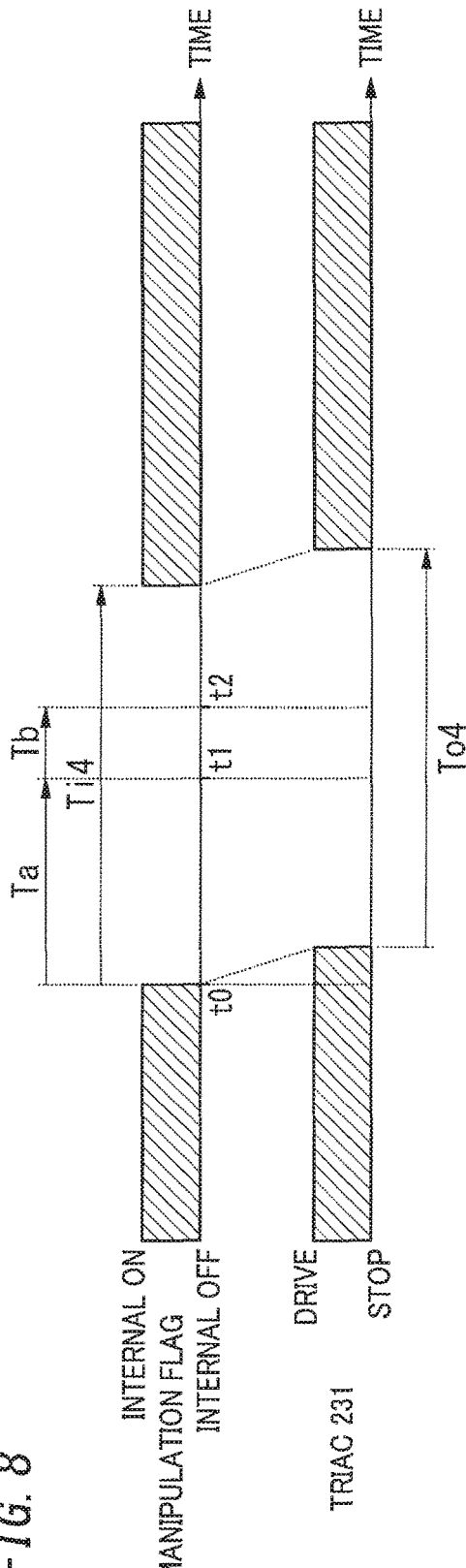

ILLUMINATION CONTROL SYSTEM, LIGHTING SYSTEM, ILLUMINATION SYSTEM, NON-TRANSITORY RECORDING MEDIUM, AND ILLUMINATION CONTROL METHOD

CROSS-REFERENCE TO RELATED APPLICATION

The present application is based upon and claims the benefit of priority of Japanese Patent Application No. 2017-184108, filed on Sep. 25, 2017, the entire contents of which are incorporated herein by reference.

TECHNICAL FIELD

The present disclosure generally relates to illumination control systems, lighting systems, illumination systems, non-transitory recording media, and illumination control methods.

BACKGROUND ART

In a known illumination system, a lighting state of an illumination fixture is switched via an illumination switch (operation section) installed on a wall.

For example, an illumination fixture (known illumination fixture) in Document 1 (JP 2015-133249 A) is connected to an alternating-current (AC) power supply via a switch configured to be turned on and off by an operation section. The illumination fixture determines whether or not a pull-less manipulation of the operation section is performed (a pull-less manipulation is a manipulation of turning on a switch in a short time after the switch in an ON state is turned off). When the illumination fixture determines that the pull-less manipulation is performed, the illumination fixture performs color changing control according to the pull-less manipulation.

Specifically, the known illumination fixture starts measuring an interruption time from turning off of the switch to turning on of the switch. When the switch is turned on again with the interruption time being shorter than a threshold, the illumination fixture determines that the pull-less manipulation is performed, and the illumination fixture switches a color state. When the interruption time reaches the threshold but the switch is not turned on again (that is, when the interruption time reaches or exceeds the threshold), the illumination fixture determines that a normal turn-off manipulation is performed, and when the switch is turned on again, the illumination fixture performs control to achieve the same color state as it was before. That is, the illumination fixture switches the color state each time the pull-less manipulation is performed.

When, however, a plurality of illumination fixtures are connected to an identical switch, component variations or the like of electric circuits included in the plurality of light fixtures may lead to a variation of interruption times measured by the plurality of illumination fixtures.

Thus, when the switch is turned on again with the interruption time being close to the threshold, the plurality of illumination fixtures may include both least one illumination fixture which determines that the interruption time is longer than or equal to the threshold and an illumination fixture which determines that the interruption time is shorter than the threshold. That is, the plurality of illumination fixtures may include an illumination fixture which switches the color state and an illumination fixture which does not switch the color state.

One of the objectives of the present disclosure is to provide an illumination control system, a lighting system, an illumination system, a non-transitory recording medium, and an illumination control method which can change lighting states of a plurality of light sources collectively to the same state in response to an ON manipulation and an OFF manipulation.

SUMMARY

An illumination control system according to an aspect of the present disclosure is an illumination control system for controlling supply of electric power to a plurality of lighting apparatuses each of which adjusts a lighting state of a corresponding one of a plurality of light sources. The illumination control system includes a manipulation detector and an electric power controller. The manipulation detector is configured to detect an ON manipulation by a user and an OFF manipulation by a user. The electric power controller is configured to stop the supply of the electric power to the plurality of lighting apparatuses when the OFF manipulation is detected. The electric power controller is configured to start the supply of the electric power to the plurality of lighting apparatuses when the ON manipulation is detected after detection of the OFF manipulation and before a first timing, or when the ON manipulation is detected at or after a second timing. The electric power controller is configured to start the supply of the electric power to the plurality of lighting apparatuses at or after the second timing when the ON manipulation is detected at or after the first timing and before the second timing. The first timing is a timing at which a threshold time which is predetermined has elapsed since the detection of the OFF manipulation. The second timing is a timing at which a predetermined forced interruption time has elapsed since the first timing.

A lighting system according to an aspect of the present disclosure includes the illumination control system and a plurality of lighting apparatuses each of which adjusts a lighting state of a corresponding one of a plurality of light sources.

A lighting system according to an aspect of the present disclosure includes the above-described illumination control system and a plurality of lighting apparatuses each of which adjusts a lighting state of a corresponding one of a plurality of light sources. Each of at least two lighting apparatuses of the plurality of lighting apparatuses measures an electric power interruption time which is a time elapsed after the supply of the electric power is stopped. When the supply of the electric power is started before a measured value of the electric power interruption time reaches a set value of a reference time which is predetermined, each of the at least two lighting apparatuses performs adjustment such that the lighting state of each of the at least two lighting apparatuses at a start of the supply of the electric power is changed from the lighting state of each of the at least two lighting apparatuses before the supply of the electric power is stopped. When the supply of the electric power is started after the measured value of the electric power interruption time reaches the set value of the reference time, each of the at least two lighting apparatuses performs adjustment such that the lighting state of each of the at least two lighting apparatuses at the start of the supply of the electric power becomes identical to the lighting state of each of the at least two lighting apparatuses before the supply of the electric power is stopped. The threshold time and the predetermined forced interruption time in connection with the electric power controller are set as described below. A value obtained by adding a first correction time to the threshold time is smaller than a value obtained by subtracting a second correction time from the reference time, and a value obtained by subtracting the first correction time from an addition value of the threshold time and the predetermined forced interruption time is larger than a value obtained by adding the second correction time to the reference time. The first correction time corresponds to a variation of the measured values of the electric power interruption time measured by the at least two lighting apparatuses. The second correction time corresponds to a variation of the set values of the reference time in connection with the at least two lighting apparatuses.

An illumination system according to an aspect of the present disclosure includes the lighting system and a plurality of light sources.

A non-transitory recording medium according to an aspect of the present disclosure is a non-transitory recording medium recording a program which causes a computer system to execute a manipulation detection step and an electric power controlling step. The manipulation detection step is a step of detecting an ON manipulation by a user and an OFF manipulation by a user. The electric power controlling step includes stopping supply of electric power to a plurality of lighting apparatuses when the OFF manipulation is detected. The electric power controlling step includes starting the supply of the electric power to the plurality of lighting apparatuses when the ON manipulation is detected after detection of the OFF manipulation and before a first timing, or when the ON manipulation is detected at or after a second timing. The electric power controlling step includes starting the supply of the electric power to the plurality of lighting apparatuses at or after the second timing when the ON manipulation is detected at or after the first timing and before the second timing. The first timing is a timing at which a threshold time which is predetermined has elapsed since the detection of the OFF manipulation. The second timing is a timing at which a predetermined forced interruption time has elapsed since the first timing.

An illumination control method according to an aspect of the present disclosure is an illumination control method for controlling supply of electric power to a plurality of lighting apparatuses each of which adjusts a lighting state of a corresponding one of a plurality of light sources. The illumination control method includes a manipulation detection step and an electric power controlling step. The manipulation detection step is a step of detecting an ON manipulation by a user and an OFF manipulation by a user. The electric power controlling step includes stopping the supply of the electric power to the plurality of lighting apparatuses when the OFF manipulation is detected. The electric power controlling step includes starting the supply of the electric power to the plurality of lighting apparatuses when the ON manipulation is detected after detection of the OFF manipulation and before a first timing, or when the ON manipulation is detected at or after a second timing. The electric power controlling step includes starting the supply of the electric power to the plurality of lighting apparatuses at or after the second timing when the ON manipulation is detected at or after the first timing and before the second timing. The first timing is a timing at which a threshold time which is predetermined has elapsed since the detection of the OFF manipulation. The second timing is a timing at which a predetermined forced interruption time has elapsed since the first timing.

BRIEF DESCRIPTION OF THE DRAWINGS

The figures depict one or more implementation in accordance with the present teaching, by way of example only, not by way of limitations. In the figures, like reference numerals refer to the same or similar elements.

FIG. 5 is a view illustrating a first operation of the illumination control system according to the embodiment;

FIG. 6 is a view illustrating a second operation of the illumination control system according to the embodiment;

FIG. 7 is a view illustrating a third operation of the illumination control system according to the embodiment;

FIG. 8 is a view illustrating a fourth operation of the illumination control system according to the embodiment;

DETAILED DESCRIPTION

The following embodiment generally relates to illumination control systems, lighting systems, illumination systems, non-transitory recording media, and illumination control methods. Specifically, the embodiment relates to an illumination control system, a lighting system, an illumination system, a non-transitory recording medium, and an illumination control method which are configured to control a plurality of illumination fixtures.

The illumination control system, the lighting system, and the illumination system of the present embodiment are mainly used in offices, factories, or retail establishments. Moreover, the illumination control system, the lighting system, and the illumination system of the present embodiment may be adopted in individual dwelling houses or dwelling units of a multiple residential dwelling complex.

The embodiment will be described below with reference to the drawings.

Figure 1:
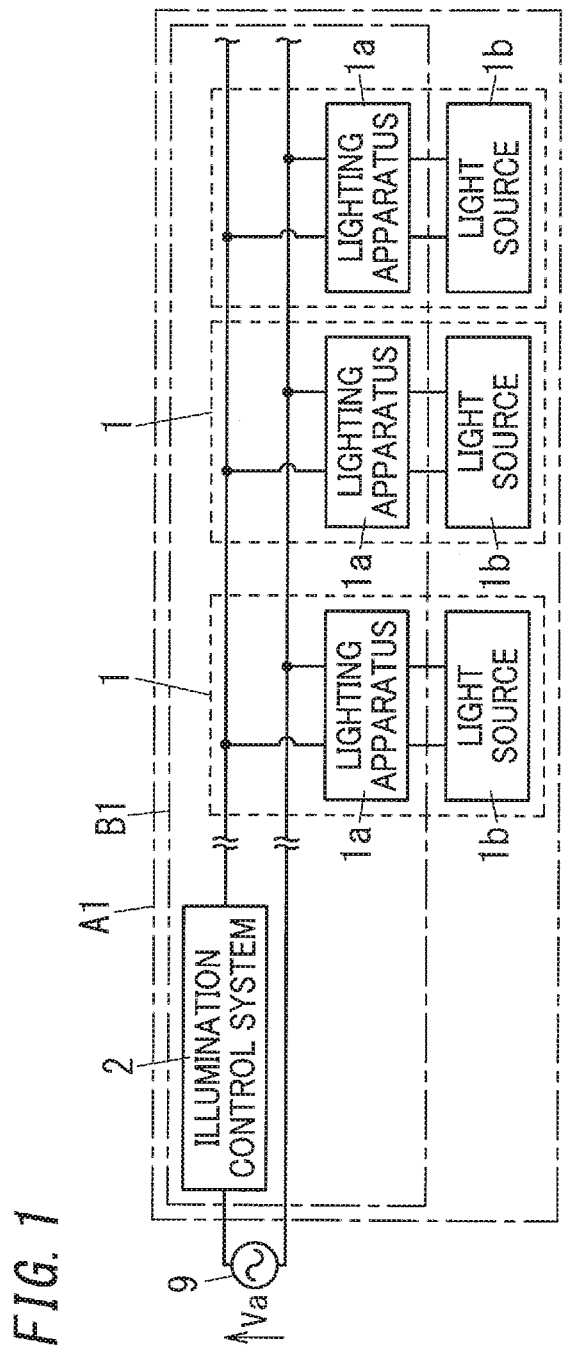
FIG. 1 is a block diagram illustrating an illumination system according to an embodiment of the present disclosure.

As illustrated in FIG. 1, an illumination system A1 of the embodiment includes a plurality of illumination fixtures 1 and an illumination control system 2.

In the illumination system A1, the plurality of illumination fixtures 1 are connected in parallel to form a parallel circuit, and the parallel circuit and the illumination control system 2 are connected to form a series circuit between both ends of a commercial power supply 9.

The illumination control system 2 of the present embodiment is a dimmer configured to perform phase control of an AC voltage of the commercial power supply 9 and supply the AC voltage to the plurality of illumination fixtures 1. The illumination control system 2 adjusts a conduction angle of an AC voltage Va of the commercial power supply 9 to enable an instruction about control contents regarding lighting states of the illumination fixtures 1 to be given to the illumination fixtures 1. In the present embodiment, the control contents regarding the lighting states of the illumination fixtures 1 are defined as dimming levels, and the illumination control system 2 is configured to adjust the conduction angle of the AC voltage Va of the commercial power supply 9 to dim (adjust the intensity of light output from) the illumination fixtures 1.

Figure 2:
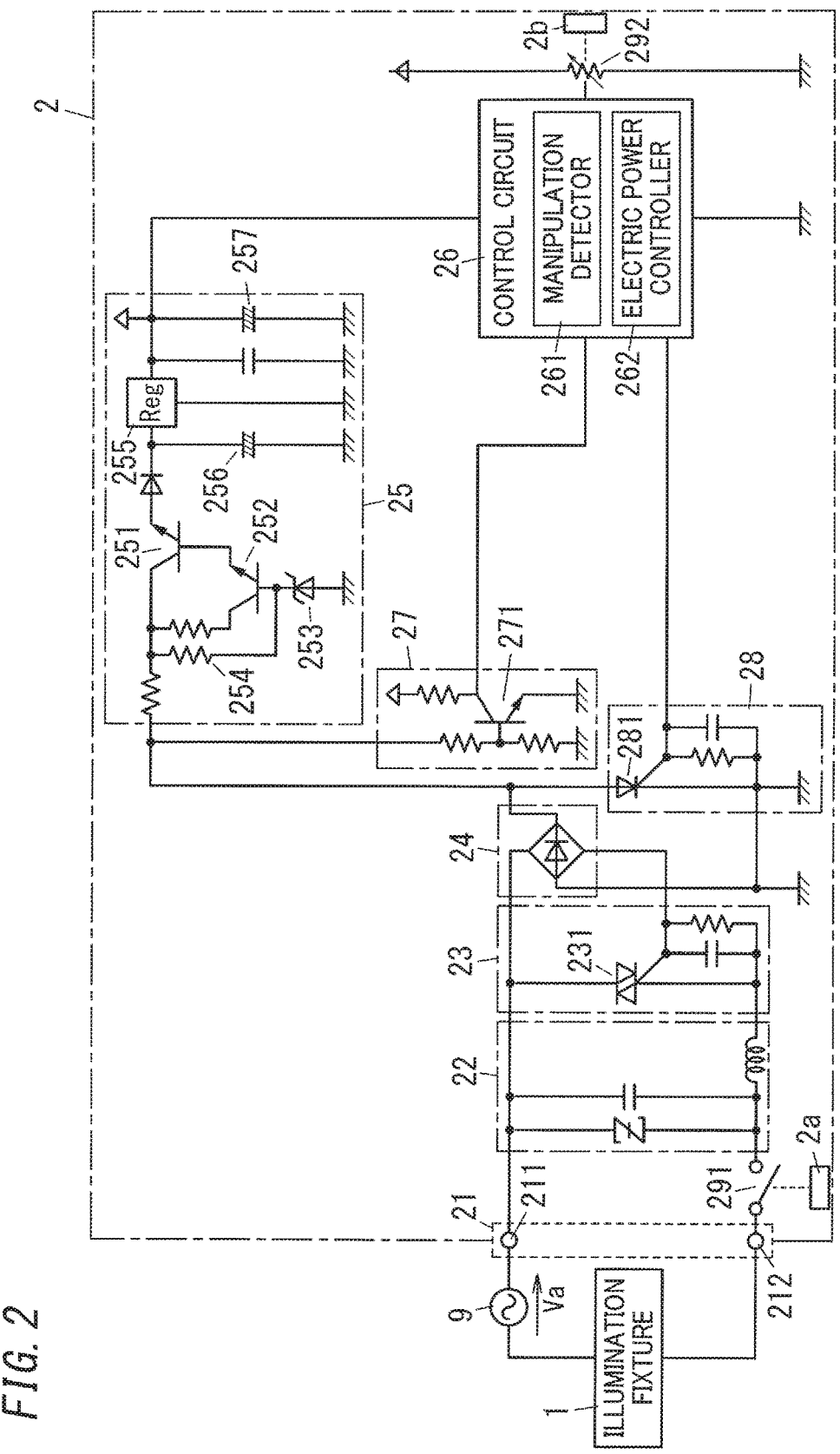
FIG. 2 is a circuit diagram illustrating an illumination control system according to the embodiment.

As illustrated in FIG. 2, the illumination control system 2 is connected in series to a series circuit of the commercial power supply 9 and the illumination fixture 1. The illumination control system 2 includes an inputter 21, a filter 22, a main switch circuit 23, a rectifier circuit 24, a power supply circuit 25, a control circuit 26, a frequency detection circuit 27, an auxiliary switch circuit 28, a switch 291, and a light intensity setting circuit 292.

The inputter 21 includes a pair of connection terminals 211 and 212. The connection terminal 211 is connected to one end of the commercial power supply 9. The connection terminal 212 is connected to the other end of the commercial power supply 9 via the illumination fixture 1.

The inputter 21 is connected to the filter 22 via the switch 291. Specifically, the connection terminal 211 is connected to the filter 22. The connection terminal 212 is connected to the filter 22 via the switch 291. The switch 291 makes or breaks an electric path between the connection terminal 212 and the filter 22 in accordance with a manipulation performed by a user. The filter 22 includes, for example, an inductor for noise removal, a capacitor for noise removal, and a surge absorber and reduces unnecessary frequency components (e.g., high-frequency noise).

The main switch circuit 23 includes a triac 231 as a main switching device. The triac 231 is connected between the pair of connection terminals 211 and 212 via the filter 22 and the switch 291.

The rectifier circuit 24 is connected between the pair of connection terminals 211 and 212. The rectifier circuit 24 performs full wave rectification on the AC voltage Va applied between the pair of connection terminals 211 and 212 to output a first rectified voltage (full-wave rectified voltage) of direct current (DC).

The power supply circuit 25 is connected between output terminals of the rectifier circuit 24. The power supply circuit 25 is configured to secure internal electric power of the illumination control system 2. The power supply circuit 25 includes transistor devices 251 and 252 and a constant voltage circuit. The transistor devices 251 and 252 are in a Darlington connection. The constant voltage circuit includes a Zener diode 253 and a resistor 254 which are connected to the base of the transistor device 252. The power supply circuit 25 further includes a linear regulator (e.g., three-terminal regulator) 255 and a buffer capacitor 256 for supplying operating power of direct current to the control circuit 26.

When the switch 291 is turned on, the first rectified voltage rectified in the rectifier circuit 24 is input to the power supply circuit 25. In the power supply circuit 25, the constant voltage circuit outputs a first DC voltage to the buffer capacitor 256. The linear regulator 255 steps down the first DC voltage of the buffer capacitor 256 to a predetermined voltage (e.g., 3 V) to obtain a step-down voltage and outputs the step-down voltage to a buffer capacitor 257. The buffer capacitor 257 supplies the operating power to the control circuit 26. In this embodiment, when a resistance value of the resistor 254 is set to a value which is high to such an extent that a current required to operate the transistor device 252 flows, it is possible to limit the value of a current flowing to ground via the Zener diode 253 to a small value so as to reduce an electric power loss.

The control circuit 26 includes a computer system including a processor and memory as main components and is operated by the operating power supplied from the linear regulator 255.

The light intensity setting circuit 292 is connected to the control circuit 26. The light intensity setting circuit 292 includes a variable resistor which is to be manipulated by a user. A manipulation performed by a user changes and sets the resistance value of the variable resistor in the light intensity setting circuit 292 to a value corresponding to an indicated dimming level.

The auxiliary switch circuit 28 is connected between the output terminals of the rectifier circuit 24. The auxiliary switch circuit 28 is configured to supply a current (electric power) to the illumination fixture 1 when the triac 231 of the main switch circuit 23 is off. The auxiliary switch circuit 28 includes a thyristor 281 as an auxiliary switching device. The thyristor 281 is connected between the output terminals of the rectifier circuit 24.

The frequency detection circuit 27 is connected between the output terminals of the rectifier circuit 24. The frequency detection circuit 27 is configured to detect the frequency (commercial frequency) of the commercial power supply 9 and a zero crossing point of the AC voltage Va. The frequency detection circuit 27 outputs a frequency detection signal to the control circuit 26.

The frequency detection circuit 27 includes a transistor device 271 and is configured such that the first rectified voltage provided from the rectifier circuit 24 is input to the base of the transistor device 271. A voltage across the collector and the emitter of the transistor device 271 is output as the frequency detection signal to the control circuit 26. The frequency detection signal is a voltage signal whose voltage value changes at a frequency two times the commercial frequency (50 Hz or 60 Hz).

The control circuit 26 detects the commercial frequency and the zero crossing point of the AC voltage Va based on the frequency detection signal. The control circuit 26 outputs a gate drive signal to the gate of the thyristor 281 based on the commercial frequency and the zero crossing point which are detected.

Specifically, the control circuit 26 determines a phase angle (ON phase angle) at which the thyristor 281 is turned on for each half wave of the AC voltage Va based on the value of a voltage generated in the variable resistor of the light intensity setting circuit 292. The control circuit 26 increases the voltage of the gate drive signal at a timing at which the ON phase angle has elapsed since the zero crossing point of the AC voltage Va to turn on the thyristor 281. The control circuit 26 reduces the voltage of the gate drive signal a predetermined time (e.g., 1 ms) before the zero crossing point of the AC voltage Va.

A time period from the turning on of the thyristor 281 to the turning off of the thyristor 281 in each half wave of the AC voltage Va is referred to as a conduction angle. That is, the control circuit 26 determines the conduction angle for each half wave of the AC voltage Va based on the resistance value of the light intensity setting circuit 292. An ON phase angle at which the thyristor 281 is turned on is advanced more with a higher dimming level and is retarded more with a lower dimming level. That is, the conduction angle increases as the dimming level increases, and the conduction angle decreases as the dimming level decreases.

A specific operation of the illumination control system 2 will be described below.

When the OFF state of the switch 291 continues, electric charges in the buffer capacitor 257 are discharged. Therefore, supply of operating power to the control circuit 26 is eventually stopped, and the control circuit 26 thus no longer operates. When the switch 291 is turned on, AC power is supplied from the commercial power supply 9 to the illumination control system 2. Thus, the operating power is supplied from the power supply circuit 25 to the control circuit 26, and the control circuit 26 is activated. Moreover, the frequency detection signal is output from the frequency detection circuit 27 to the control circuit 26, which enables the control circuit 26 to detect the commercial frequency and the zero crossing point. The control circuit 26 outputs the gate drive signal to the gate of the thyristor 281 such that the conduction angle based on the resistance value of the light intensity setting circuit 292 is achieved.

When the voltage of the gate drive signal increases, the thyristor 281 is turned on and the drive current flows to the gate of the triac 231 via the thyristor 281, which also turns on the triac 231. When the triac 231 is turned on, almost no current flows to the rectifier circuit 24, and thus, almost no electric power is supplied from the rectifier circuit 24 to the power supply circuit 25. When electric power is no longer supplied from the rectifier circuit 24 to the power supply circuit 25, electric charges charged in the buffer capacitor 256 secures operating power of the control circuit 26.

When the triac 231 is turned on, an electric path is made between the commercial power supply 9 and the illumination fixture 1, and the AC voltage Va is applied to the illumination fixture 1. The control circuit 26 reduces the voltage of the gate drive signal a predetermined time before the zero crossing point. When the voltage of the gate drive signal is reduced and an anode current of the thyristor 281 becomes lower than or equal to a holding current of the thyristor 281, the thyristor 281 performs self-arc-extinguishing and is turned off. When the thyristor 281 is turned off, the drive current is no longer supplied to the gate of the triac 231, and when the anode current of the triac 231 becomes smaller than or equal to the holding current of the triac 231, the triac 231 performs self-arc-extinguishing and is turned off. When the triac 231 is turned off, the electric path between the commercial power supply 9 and the illumination fixture 1 is broken.

When the triac 231 is turned off, electric power is supplied from the rectifier circuit 24 to the power supply circuit 25. Thus, the control circuit 26 is configured to detect a next zero crossing point of the AC voltage Va based on the frequency detection signal from the frequency detection circuit 27 and to determine, with reference to the zero crossing point which is detected, a next ON phase angle at which the voltage of the gate drive signal increases.

As described above, the illumination control system 2 performs phase control of the AC voltage Va to achieve a conduction angle corresponding to the dimming level set by the light intensity setting circuit 292. An AC voltage Va subjected to the phase control by the illumination control system 2 is applied to the illumination fixture 1.

Figure 3:
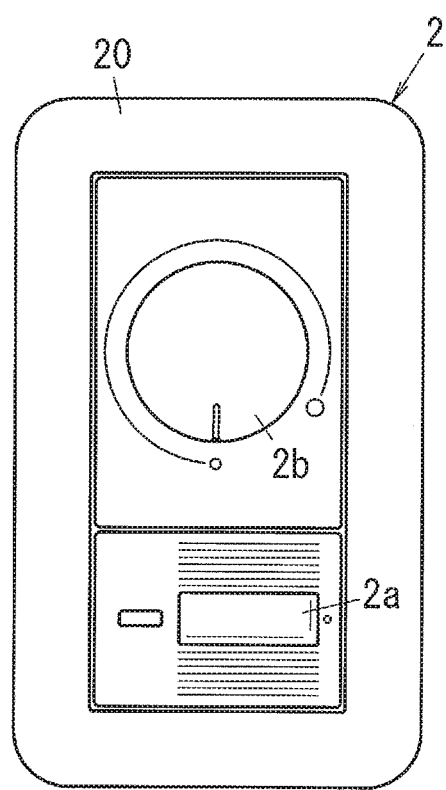
FIG. 3 is a front view illustrating the illumination control system according to the embodiment.

FIG. 3 shows the exterior of the illumination control system 2. The illumination control system 2 of the present embodiment includes a dimmer 20 of a phase control type. The illumination control system 2 includes a lighting button 2a (operation section) and a dimming dial 2b on a front surface of the dimmer 20.

The lighting button 2a receives a pressing manipulation when a user turns on the illumination fixture 1 and turns off the illumination fixture 1. The pressing manipulation on the lighting button 2a alternately turns on and off the switch 291. The pressing manipulation performed on the lighting button 2a to turn on the switch 291 is referred to as an ON manipulation. The pressing manipulation performed on the lighting button 2a to turn off the switch 291 is referred to as an OFF manipulation. Bringing the switch 291 into an ON state lights the illumination fixture 1, and bringing the switch 291 into an OFF state turns off the illumination fixture 1.

Moreover, the dimming dial 2b is turned when a user sets the dimming level. A user clockwise turns the dimming dial 2b to raise the dimming level and counterclockwise turns the dimming dial 2b to lower the dimming level. In the light intensity setting circuit 292, turning the dimming dial 2b changes the resistance value of the variable resistor.

Note that the illumination control system 2 does not necessarily include the lighting button 2a, the dimming dial 2b, the switch 291, and the light intensity setting circuit 292. For example, the lighting button 2a, the dimming dial 2b, the switch 291, and the light intensity setting circuit 292 may be one or more systems (separated devices) different from the illumination control system 2. Alternatively, the switch 291 may be mechanically turned on and off through displacement of the lighting button 2a, or the on/off control of the switch 291 may be performed by a controller which receives a manipulation signal from the lighting button 2a.

Moreover, the illumination control system 2 does not necessary include the switch 291. In this case, the lighting button 2a notifies the control circuit 26 of occurrences of the ON manipulation and the OFF manipulation. The control circuit 26 performs switching control of the auxiliary switch circuit 28 and the main switch circuit 23 in accordance with the ON manipulation and the OFF manipulation of the lighting button 2a.

Figure 4:
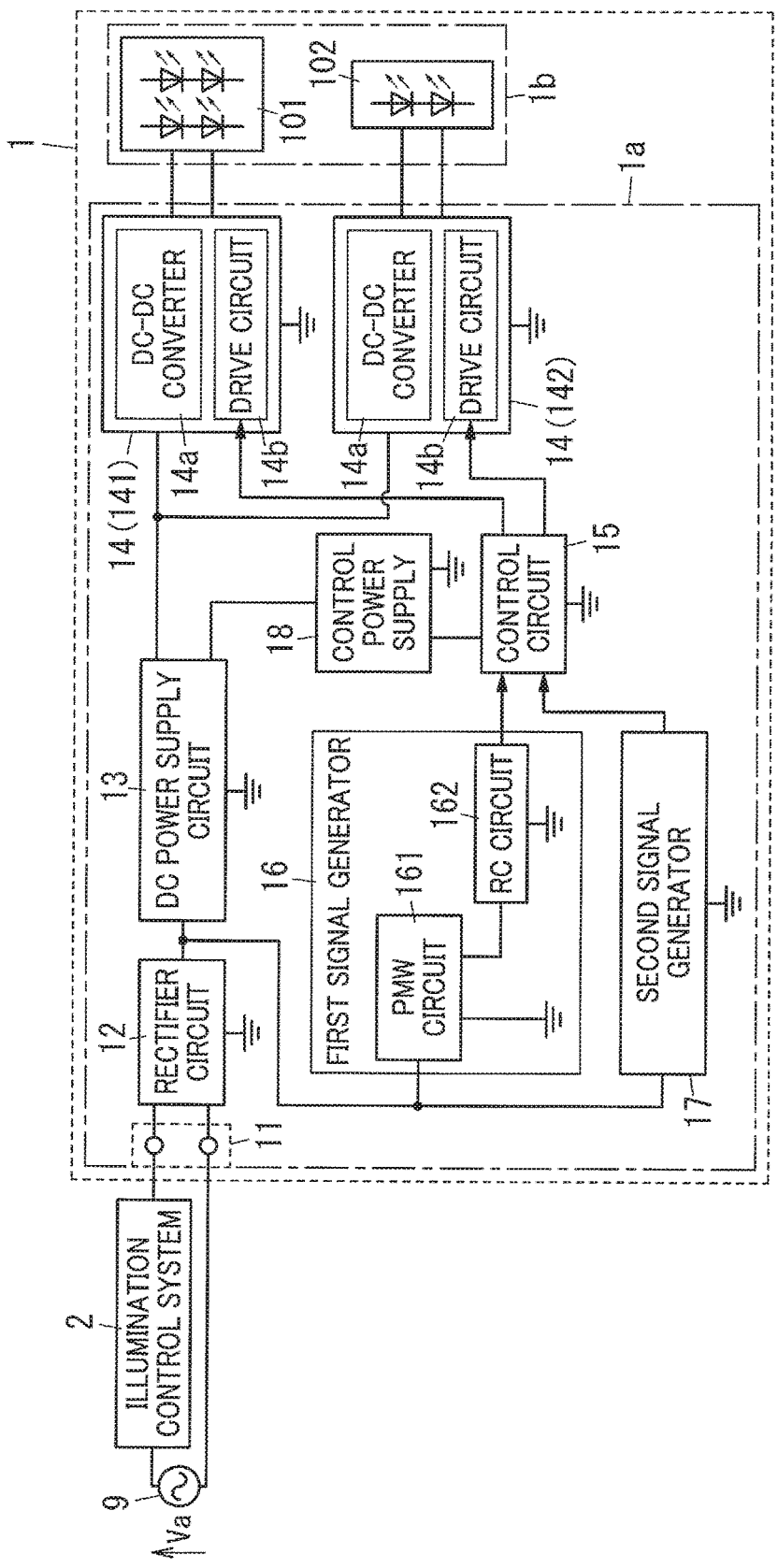
FIG. 4 is a block diagram illustrating an illumination fixture according to the embodiment.

Next, the illumination fixture 1 will be described. The illumination fixture 1 is an illumination fixture which enables the intensity and color of light to be controlled. As illustrated in FIG. 4, the illumination fixture 1 includes a lighting apparatus 1a and a light source 1b. Note that as illustrated in FIG. 1, a lighting system B1 includes the illumination control system 2 and the lighting apparatuses 1a.

The lighting apparatus 1a includes an inputter 11, a rectifier circuit 12, a DC power supply circuit 13, two constant current circuits 14, a control circuit 15, a first signal generator 16, a second signal generator 17, and a control power supply 18.

The inputter 11 includes, for example, a connector, a terminal block, or a blade, and electrical and mechanical connection to a power supply path is attachable to and detachable from the inputter 11. Electric power is supplied to the power supply path from the commercial power supply 9 via the illumination control system 2. That is, the AC voltage Va subjected to the phase control performed by the illumination control system 2 is applied to the inputter 11. Note that the power supply path includes any one of, for example, an electric wire cable, a power supply duct, and a conductor bar.

The rectifier circuit 12 is a full-wave rectifier circuit including a diode bridge and performs full wave rectification on the AC voltage applied to the inputter 11 to obtain a second rectified voltage and outputs the second rectified voltage. Moreover, a filter circuit may be provided upstream of the rectifier circuit 12. The filter circuit includes, for example, an inductor for noise removal, a capacitor for noise removal, and a surge absorber to reduce unnecessary frequency components (e.g., high-frequency noise).

The DC power supply circuit 13 receives the second rectified voltage from the rectifier circuit 12 and outputs a second DC voltage obtained by smoothing the second rectified voltage.

Each of the two constant current circuits 14 includes a DCDC converter 14a (switching converter) having a semiconductor switching element and a drive circuit 14b. Each DCDC converter 14a receives the second DC voltage provided from the DC power supply circuit 13 and supplies load power of direct current to the light source 1b. For example, the DCDC converter 14a includes a non-insulated fly back converter or an LLC resonance converter. The drive circuit 14b is a circuit for performing ON-OFF drive of the semiconductor switching element of the DCDC converter 14a. Note that each constant current circuit 14 preferably has a power factor improvement function.

The light source 1b includes light source modules 101 and 102. The light source module 101 is a light source having a first light emission color. In the present embodiment, the light source module 101 includes a plurality of LEDs for outputting light having a color temperature of 2000 K. The light source module 102 is a light source having a second light emission color different from that of the light source module 101. In the present embodiment, the light source module 102 includes a plurality of LEDs for outputting light having a color temperature of 8000 K. Note that the plurality of LEDs included in the light source module 101 are in series connection or in series-parallel connection. Moreover, the plurality of LEDs included in the light source module 102 are in series connection or in series-parallel connection.

Light emitted from the light source 1b is mixed-color light of light emitted from the light source module 101 and light emitted from the light source module 102. The quantity of light of each of the light source modules 101 and 102 is adjusted to control the dimming level and the color state (color temperature) of the mixed-color light.

One of the two constant current circuits 14 is a constant current circuit 141 configured to supply a load current to the light source module 101, and the other of the two constant current circuits 14 is a constant current circuit 142 configured to supply a load current to the light source module 102.

The first signal generator 16 includes a pulse width modulation (PWM) circuit 161 and an RC circuit 162.

The PWM circuit 161 is a circuit configured to generate a PWM signal based on the waveform of the second rectified voltage provided from the rectifier circuit 12. The PWM circuit 161 compares the second rectified voltage with a determination reference value, generates a PWM signal based on a result of the comparison, and outputs the PWM signal. In this embodiment, the PWM signal is a pulse signal synchronized with the AC voltage subjected to the phase control performed by the illumination control system 2, and the duty ratio of the PWM signal corresponds to the magnitude of the conduction angle.

The RC circuit 162 is an integrating circuit including a resistor and a capacitor and outputs a first control signal obtained by integrating the PWM signal to the control circuit 15. The first control signal is a voltage signal of direct current, and the voltage value of the first control signal corresponds to the magnitude of the conduction angle. That is, the first control signal includes information (conduction angle information) regarding the conduction angle of the AC voltage Va controlled by the illumination control system 2.

The second signal generator 17 is a voltage dividing circuit including a plurality of resistors. The second signal generator 17 outputs a voltage to the control circuit 15. The voltage is obtained by dividing the second rectified voltage provided from the rectifier circuit 12 and serves as a second control signal. The second control signal includes information (electric power interruption time information) regarding an electric power interruption time which is a time when supply of electric power to the illumination fixture 1 is interrupted by the illumination control system 2.

The control circuit 15 includes a computer system including a processor and memory as main components, and based on the first control signal and the second control signal, the control circuit 15 outputs switching control signals to the drive circuits 14b of the constant current circuits 141 and 142. Each drive circuit 14b performs ON-OFF drive of the semiconductor switching element of the DCDC converter 14a based on the switching control signal.

That is, the control circuit 15 controls load currents to be supplied to the light source modules 101 and 102 based on the first control signal and the second control signal, which enables the light source 1b to be dimmed and changed in its color. In the present embodiment, the control circuit 15 performs dimming control of the light source 1b based on the conduction angle information included in the first control signal and performs color control of the light source 1b based on the electric power interruption time information included in the second control signal.

The control power supply 18 receives the second DC voltage provide from the DC power supply circuit 13 and outputs a DC control voltage to the control circuit 15. The control circuit 15 is operated by the DC control voltage.

Next, the dimming control and the color control of the illumination fixture 1 performed by the illumination control system 2 will be described.

When the switch 291 is in the ON state, the AC voltage Va subjected to the phase control is applied to each of the inputters 11 of the plurality of illumination fixtures 1, and AC power is supplied from the commercial power supply 9 to each of the plurality of illumination fixtures 1. When the switch 291 is in the OFF state, the AC voltage Va subjected to the phase control is not applied to each of the inputters 11 of the plurality of illumination fixtures 1, and the AC power is not supplied from the commercial power supply 9 to each of the plurality of illumination fixtures 1.

When the switch 291 is in the ON state, the control circuit 15 in each of the plurality of illumination fixtures 1 performs the dimming control and the color control based on the first control signal and the second control signal. That is, the control circuit 15 controls load currents output from the constant current circuits 141 and 142 based on the first control signal and the second control signal to adjust the dimming level and the color state (color temperature) of the mixed-color light to be emitted from the light source 1b.

The control circuit 15 controls the load currents output from the constant current circuits 141 and 142 based on the first control signal provided from the first signal generator 16 to achieve a dimming level corresponding to the conduction angle of the AC voltage Va.

Moreover, the control circuit 15 switches the color state according to the second control signal. The control circuit 15 sets the load currents to be output from the constant current circuits 141 and 142 such that the dimming level does not change before and after the color state is switched.

As described above, the second control signal has a voltage obtained by dividing the second rectified voltage provided from the rectifier circuit 12. The control circuit 15 is configured to detect a zero cross of the second control signal to determine whether the illumination control system 2 is in an electric power supply state or an electric power interruption state. The electric power supply state of the illumination control system 2 refers to a state where the switch 291 is on and the AC power is being supplied to the illumination fixture 1. The electric power interruption state of the illumination control system 2 refers to a state where the switch 291 is off and the supply of the AC power to the illumination fixture 1 is being interrupted. Specifically, when succeeding in detecting the zero cross of the second control signal, the control circuit 15 determines that the illumination control system 2 is in the electric power supply state, whereas when failing to detect the zero cross of the second control signal, the control circuit 15 determines that the illumination control system 2 is in the electric power interruption state. Alternatively, when failing to detect the zero cross of the second control signal during a definite time period, the control circuit 15 may determine that the illumination control system 2 is in the electric power interruption state.

When the ON state of the switch 291 continues, a result of the determination by the control circuit 15 shows that the illumination control system 2 is continuously in the electric power supply state. When a state where the control circuit 15 determines that the illumination control system 2 is in the electric power supply state changes to a state where the control circuit 15 determines that the illumination control system 2 is in the electric power interruption state, the control circuit 15 starts time-measuring operation that measure a measurement time. The measurement time is defined as a measured value To of the electric power interruption time. The control circuit 15 monitors whether or not the illumination control system 2 switches from the electric power interruption state to the electric power supply state before the measured value To of the electric power interruption time reaches a set value of a reference time Ts which is predetermined. That is, the control circuit 15 monitors whether or not electric power supply via the illumination control system 2 is started (restarted) before the measured value To of the electric power interruption time reaches the set value of the reference time Ts.

Note that the reference time Ts is a specification value (truth value) of the reference time and is predetermined as a value common to the plurality of illumination fixtures.

Moreover, the set value of the reference time Ts is a value which an electric circuit of each of the plurality of illumination fixtures 1 has in accordance with the reference time Ts. The set value of the reference time Ts depends on, for example, the voltage of the capacitor or the count number of clock signals. Set values of the reference time Ts may vary due to, for example, component variations of the electric circuits of the plurality of illumination fixtures 1.

Note that until a time longer than the set value of the reference time Ts elapses after the illumination control system 2 has been switched from the electric power supply state to the electric power interruption state, the control power supply 18 can output a control voltage due to remaining electric charges in, for example, the capacitor. Thus, the control circuit 15 can perform the monitoring process.

When the illumination control system 2 is switched from the electric power interruption state to the electric power supply state before the measured value To of the electric power interruption time reaches the set value of the reference time Ts, the control circuit 15 determines that a user performs a color changing manipulation. The color changing manipulation is a manipulation of performing the ON manipulation in a short time after the OFF manipulation of the lighting button 2a by a user while the illumination fixture 1 is on. When the color changing manipulation is performed, the switch 291 is turned on again in a short time after the switch 291 in the ON state is turned off, and the result of the determination by the control circuit 15 changes in the order of "the electric power supply state", "the electric power interruption state", and "the electric power supply state" in a short time.

When the control circuit 15 determines that the color changing manipulation is performed, the control circuit 15 switches the color state of the light source 1b. For example, each time the control circuit 15 determines that the color changing manipulation is performed, the control circuit 15 switches the color state of the light source 1b alternately to an incandescent color and a daylight color.

Moreover, the control circuit 15 holds information regarding a dimming state before the illumination control system 2 is brought into the electric power interruption state. When the illumination control system 2 is not switched from the electric power interruption state to the electric power supply state before the measured value To of the electric power interruption time reaches the measured value of the reference time Ts, the control circuit 15 stores the dimming state before the illumination control system 2 is brought into the electric power interruption state. When supply of electric power via the illumination control system 2 is started after the measured value To of the electric power interruption time reaches the measured value of the reference time Ts, and the result of the determination is "the electric power supply state", the control circuit 15 performs the dimming control of the light source 1b to achieve the dimming state before the illumination control system 2 is brought into the electric power interruption state.

As described above, the control circuit 15 monitors whether or not the illumination control system 2 is switched from the electric power interruption state to the electric power supply state before the measured value To of the electric power interruption time reaches the set value of the reference time Ts to determine whether or not the toning manipulation is performed by a user.

The measured values To of the electric power interruption time measured by the plurality of illumination fixtures 1 may, however, vary due to, for example, component variations of the electric circuits of the plurality of illumination fixtures 1. Moreover, the set values of the reference time Ts which are compared with the measured values To of the electric power interruption time by the plurality of illumination fixtures 1 may also vary.

As a result, when the electric power supply is started with the measured value To of the electric power interruption time being close to the reference time Ts, there may be both an illumination fixture 1 which determines that the measured value To of the electric power interruption time is larger than or equal to a value corresponding to the reference time Ts and an illumination fixture 1 which determines that the measured value To of the electric power interruption time is smaller than a value corresponding to the reference time Ts. That is, the plurality of illumination fixtures 1 include an illumination fixture 1 which switches the color state and an illumination fixture 1 which does not switch the color state.

Thus, the illumination control system 2 of the present embodiment has the following configuration and performs the following operation.

The control circuit 26 of the illumination control system 2 includes a manipulation detector 261 and an electric power controller 262.

The manipulation detector 261 detects, based on a frequency detection signal, that the ON manipulation and the OFF manipulation of the lighting button 2a performed by a user. Specifically, when the ON manipulation of the lighting button 2a brings the switch 291 into the ON state, the frequency detection signal becomes a voltage signal which varies at a frequency two times the commercial frequency. When the OFF manipulation of the lighting button 2a brings the switch 291 into the OFF state, the frequency detection signal has 0 V. Thus, the manipulation detector 261 compares the voltage value of the frequency detection signal with the threshold, which enables the manipulation detector 261 to detect that the ON manipulation and the OFF manipulation of the lighting button 2a are performed. Note that also after the switch 291 is switched from the ON state to the OFF state, the power supply circuit 25 can supply operating power due to remaining electric charges in, for example, the buffer capacitor 257. Thus, the control circuit 26 can operate for a while after the switch 291 is switched from the ON state to the OFF state.

The electric power controller 262 recognizes the ON manipulation and the OFF manipulation of the lighting button 2a performed by a user as an instruction of switching between an internal ON state and an internal OFF state. The internal ON state and the internal OFF state represent, for example, states of a manipulation flag of a flag resistor used for an arithmetic process by the control circuit 26. The value "1" of the manipulation flag corresponds to the internal ON state, and the value "0" of the manipulation flag corresponds to the internal OFF state. When the OFF manipulation is detected, the electric power controller 262 brings the manipulation flag into the internal OFF state, and when the ON manipulation is detected, the electric power controller 262 brings the manipulation flag into the internal ON state. Alternatively, the value "0" of the manipulation flag may correspond to the internal ON state, and the value "1" of the manipulation flag may correspond to the internal OFF state.

The electric power controller 262 switches the triac 231 to a driving state or a stop state based on the state of the manipulation flag (detection result of the manipulation detector 261). The driving state of the triac 231 is a state where the electric power controller 262 outputs the gate drive signal to control the ON phase angle of the thyristor 281 and the ON phase angle of the triac 231, and as a result, the AC voltage Va subjected to the phase control is applied to the plurality of illumination fixtures 1. The stop state of the triac 231 is a state where the electric power controller 262 stops outputting the gate drive signal to keep the thyristor 281 and the triac 231 in the OFF state, and thus, the AC voltage Va is applied to none of the plurality of illumination fixtures 1.

In FIGS. 5 to 8, the state of the manipulation flag is shown in the upper section, and the state of the triac 231 is shown in the lower section.

In the following description, a start timing (detection timing of the OFF manipulation) of the internal OFF state is an OFF timing to. The electric power controller 262 defines, as a first timing t1, a timing at which a threshold time Ta which is predetermined has elapsed since the OFF timing t0. Moreover, the electric power controller 262 defines, as a second timing t2, a timing at which a predetermined forced interruption time Tb has elapsed since the first timing t1.

In FIG. 5, the manipulation flag is, after the OFF timing t0, switched to the internal ON state again before a timing at which the threshold time Ta which is predetermined elapses. In this case, an internal interruption time Ti1 is a time until the manipulation flag is brought into the internal ON state again after the manipulation flag is brought into the internal OFF state. That is, the internal interruption time Ti1 is shorter than the threshold time Ta (Ti1<Ta).

The electric power controller 262 stops outputting the gate drive signal at the OFF timing t0 to switch the triac 231 from the driving state to the stop state. Since the internal interruption time Ti1 is shorter than the threshold time Ta, the electric power controller 262 starts outputting the gate drive signal when the manipulation flag is switched from the internal OFF state to the internal ON state again, and the electric power controller 262 switches the triac 231 from the stop state to the driving state. Note that a time delay is caused between a timing at which the electric power controller 262 stops outputting the gate drive signal and a timing at which the triac 231 is actually brought into the stop state. Moreover, a time delay is caused between a timing at which the electric power controller 262 starts outputting the gate drive signal a timing at which the triac 231 is actually brought into the driving state.

In this case, a time from a timing at which the triac 231 is brought into the stop state to a timing at which the triac 231 is brought into the driving state again corresponds to an electric power interruption time To1, and the electric power interruption time To1 becomes equal to the internal interruption time Ti1 (To1=Ti1). The measured value To of the electric power interruption time is a value obtained by measuring the electric power interruption time To1.

Next, in FIG. 6, the manipulation flag is switched to the internal ON state again at the first timing t1 at which the threshold time Ta has elapsed since the OFF timing t0. In this case, an internal interruption time Ti2 is a time until the manipulation flag is brought into the internal ON state again after the manipulation flag is brought into the internal OFF state. That is, the internal interruption time Ti2 is equal to the threshold time Ta (Ti2=Ta).

The electric power controller 262 stops outputting the gate drive signal at the OFF timing t0 to switch the triac 231 from the driving state to the stop state. Then, even when the manipulation flag is switched from the internal OFF state to the internal ON state again at the first timing t1, the electric power controller 262 does not immediately start outputting the gate drive signal because the internal interruption time Ti2 is equal to the threshold time Ta. At the second timing t2 at which the predetermined forced interruption time Tb has elapsed since the first timing t1, the electric power controller 262 starts outputting the gate drive signal to switch the triac 231 from the stop state to the driving state.

In this case, a time until the triac 231 is brought into the driving state again after the triac 231 is brought into the stop state corresponds to an electric power interruption time To2. The electric power interruption time To2 is the sum of the threshold time Ta and the predetermined forced interruption time Tb (To2=Ta+Tb). The measured value To of the electric power interruption time is a value obtained by measuring the electric power interruption time To2.

Next, in FIG. 7, the manipulation flag is switched to the internal ON state again after the first timing t1 and before the second timing t2. In this case, an internal interruption time Ti3 is a time until the manipulation flag is brought into the internal ON state again after the manipulation flag is brought into the internal OFF state. That is, the internal interruption time Ti3 is longer than the threshold time Ta and shorter than the sum of the threshold time Ta and the predetermined forced interruption time Tb (Ta<Ti3<Ta+Tb).

The electric power controller 262 stops outputting the gate drive signal at the OFF timing t0 to switch the triac 231 from the driving state to the stop state. Then, even when the manipulation flag is switched from the internal OFF state to the internal ON state again after the first timing t1, the electric power controller 262 does not immediately start outputting the gate drive signal because the internal interruption time Ti3 is longer than the threshold time Ta and shorter than the sum of the threshold time Ta and the predetermined forced interruption time Tb. The electric power controller 262 defines a timing at which an additional time Tc has elapsed since the second timing t2 as a third timing t3, and at the third timing t3, the electric power controller 262 starts outputting the gate drive signal to switch the triac 231 from the stop state to the driving state.

In this case, a time from a timing at which the triac 231 is brought into the stop state to a timing at which the triac 231 is brought into the driving state again corresponds to an electric power interruption time To3, and the electric power interruption time To3 is longer than the sum of the threshold time Ta and the predetermined forced interruption time Tb (To3>Ta+Tb).

Next, in FIG. 8, the manipulation flag is switched to the internal ON state again at or after the second timing t2. In this case, an internal interruption time Ti4 is a time until the manipulation flag is brought into the internal ON state again after the manipulation flag is brought into the internal OFF state. That is, the internal interruption time Ti4 is longer than or equal to the sum of the threshold time Ta and the predetermined forced interruption time Tb (Ti4>Ta+Tb).

The electric power controller 262 stops outputting the gate drive signal at the OFF timing t0 to switch the triac 231 from the driving state to the stop state. Since the internal interruption time Ti4 is longer than or equal to the sum of the threshold time Ta and the predetermined forced interruption time Tb, the electric power controller 262 starts outputting the gate drive signal to switch the triac 231 from the stop state to the driving state when the manipulation flag is switched from the internal OFF state to the internal ON state again.

In this case, a time from a timing at which the triac 231 is brought into the stop state to a timing at which the triac 231 is brought into the driving state again corresponds to an electric power interruption time To4, and the electric power interruption time To4 is longer than the sum of the threshold time Ta and the predetermined forced interruption time Tb (To4>Ta+Tb).

The measured value To of the electric power interruption time is a value obtained by measuring the electric power interruption time To1, To2, To3, or To4.

As shown in FIGS. 5 to 8, in the illumination control system 2, the electric power interruption time does not have a value within a range of greater than or equal to Ta to less than (Ta+Tb). That is, in the illumination control system 2, the electric power interruption time is shorter than Ta or longer than or equal to (Ta+Tb).

Figure 9:
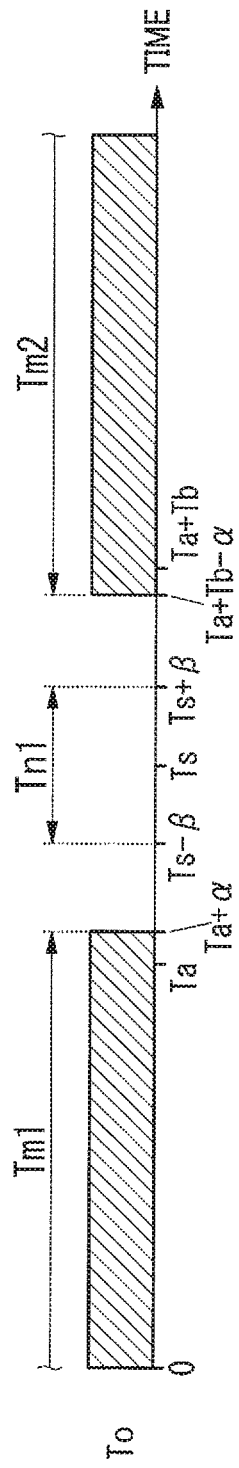
FIG. 9 is a view illustrating a relationship of a threshold time and a forced interruption time to a measured value and a reference time of an electric power interruption time according to the embodiment.

FIG. 9 shows the relationship of the threshold time Ta and the predetermined forced interruption time Tb adopted in the illumination control system 2 to the measured value To and the reference time Ts of the electric power interruption time of the illumination fixture 1 according to the present embodiment.

A correction time corresponding to a variation in measured values To of the electric power interruption times of the plurality of lighting apparatuses 1a is defined as a first correction time α. A correction time corresponding to a variation of the set values of the reference time Ts of the plurality of lighting apparatuses 1a is defined as a second correction time β. In this case, a value (Ta+α) obtained by adding the first correction time α to the threshold time Ta is smaller than a value (Ts−β) obtained by subtracting the second correction time β from the reference time Ts. Moreover, a value (Ta+Tb−α) obtained by subtracting the first correction time α from the addition value of the threshold time Ta and the predetermined forced interruption time Tb is larger than a value (Ts+β) obtained by adding the second correction time β to the reference time Ts.

Thus, when the control circuit 15 of the lighting apparatus 1a is controlled by the illumination control system 2 such that the electric power interruption time is shorter than Ta or longer than or equal to (Ta+Tb) as described above, the measured values To of the electric power interruption time fall within a range Tm1 or a range Tm2 in FIG. 9. Moreover, the set values of the reference time Ts fall within a range Tn1 in FIG. 9. The upper limit of the range Tm1 is (Ta+α), the lower limit of the range Tm2 is (Ta+Tb−α), the range Tn1 is a range of ±β from Ts, and the range Tn1 overlaps neither the range Tm1 nor the range Tm2.

Thus, even when the measured values To of the electric power interruption time and the set values of the reference time Ts of the plurality of illumination fixtures 1 vary, results of determination of whether or not the measured values To of the electric power interruption time are larger than or equal to the reference time Ts are the same for the plurality of illumination fixtures 1. Therefore, it is possible to reduce probabilities where both an illumination fixture 1 which switches the color state and an illumination fixture 1 which does not switch the color state are present when a user performs a color changing manipulation. That is, manipulating the lighting button 2a enables the plurality of illumination fixtures 1 to be in the same color state.

Moreover, the ON manipulation performed in a short time after the OFF manipulation, which is performed on the lighting button 2a by a user while the illumination fixture 1 is lighting, may correspond to a manipulation other than the color changing manipulation. For example, the ON manipulation performed in a short time after the OFF manipulation, which is performed on the lighting button 2a by a user while the illumination fixture 1 is lighting, may be a stepwise dimming manipulation of stepwise switching the dimming level of the illumination fixture 1 or a fade-switching manipulation of stepwise switching a fade time. Alternatively, the ON manipulation may be a module switching manipulation for switching a light source module to be lit (e.g., switching between a normal illumination lamp and a night light). Also in this case, manipulating the lighting button 2a enables the plurality of illumination fixtures 1 to be controlled to be in the same lighting state. Note that the module switching manipulation is a manipulation for, when the light source 1b includes a plurality of light source modules, setting which one or more of the plurality of light source modules are to be lit. In this case, the lighting state of the light source indicates which one or more of the plurality of light source modules are lit. That is, the lighting state of the light source corresponds to a combination of one or more lit light source modules and one or more unlit light source modules of the plurality of light source modules of the light source.

In the embodiment, the lighting apparatuses 1a of all the illumination fixtures 1 control both the dimming level and the color state based on conduction angle information of the first control signal and the electric power interruption time information of the second control signal. However, in only some (at least two) of the plurality of illumination fixtures 1, the lighting apparatuses 1a may be configured to control both the dimming level and the color state based on the first control signal and the second control signal. In this case, the lighting apparatuses 1a of the other illumination fixtures 1 control the dimming level based on the first control signal but do not control the color state. Moreover, the lighting apparatuses of the other illumination fixtures 1 do not have to include the second signal generator 17 in the configuration of the lighting apparatus 1a.

For example, it is assumed that a plurality of illumination fixtures 1 are installed in a dining room of a dwelling house, some of the illumination fixtures 1 are pendant lights, and the other illumination fixtures 1 are ceiling lamps. The pendant lights can be dimmed and changed in color, and the pendant lights irradiate a dining table with light. The ceiling lamps are only dimmable and uniformly irradiate the dining room with light having a fixed color temperature. In this case, lighting apparatus of the pendant lights control both the dimming level and the color state based on a first control signal and a second control signal, and lighting apparatuses of the ceiling lamps control the dimming level based on the first control signal but do not control the color state.

As described above, it is not essential that all the illumination fixtures 1 control both the dimming level and the color state based on the first control signal and the second control signal. The plurality of illumination fixtures 1 may include two or more illumination fixtures 1 which control both the dimming level and the color state based on the first control signal and the second control signal and the other illumination fixtures 1 which control the dimming level based on the first control signal but do not control the color state.

In other words, at least two lighting apparatuses 1a of the plurality of lighting apparatuses 1a perform color changing control based on the second control signal, and the other lighting apparatuses 1a do not have to perform the color changing control. That is, the plurality of lighting apparatuses 1a in the illumination control system 2 may include at least two lighting apparatuses 1a which perform the color changing control based on the second control signal and lighting apparatuses 1a which do not perform the color changing control based on the second control signal.

Each of the control circuits 15 and 26 in the embodiment may include a computer system. In this case, the computer system includes a processor and memory as hardware as main components. The processor executes a program stored in the memory of the computer system to realize each function of the control circuits 15 and 26 in the present disclosure. The program may be stored in the memory of the computer system in advance, provided via an electronic communication network, or provided as a non-transitory recording medium such as a computer system-readable memory card, an optical disc, or a hard disk drive storing the program. The processor of the computer system includes one or a plurality of electronic circuits including a semiconductor integrated circuit (IC) or a large scale integrated circuit (LSI). The plurality of electron circuits may be integrated into a single chip or distributed over a plurality of chips. The plurality of chips may be integrated into one device or distributed over a plurality of devices.

Figure 10:
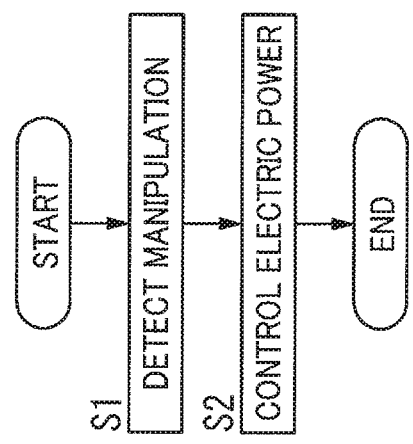
FIG. 10 is a flowchart illustrating operation of the illumination control system according to the embodiment.

The program executed by the control circuit 26 includes steps shown in the flowchart of FIG. 10.

First, the control circuit 26 detects the ON manipulation and the OFF manipulation of the lighting button 2a by a user (manipulation detection step S1). Then, the control circuit 26 outputs a gate drive signal based on a detection result in the manipulation detection step S1, adjusts the ON phase angle of the thyristor 281 and the ON phase angle of the triac 231, and controls supply of electric power to the plurality of lighting apparatuses 1a (electric power controlling step S2).

In the electric power controlling step S2, the control circuit 26 stops the supply of the electric power to the plurality of lighting apparatuses 1a when the OFF manipulation is detected. The control circuit 26 starts supplying the electric power to the plurality of lighting apparatuses 1a when the ON manipulation is detected after the detection of the OFF manipulation and before the first timing t1 or when the ON manipulation is detected at or after the second timing t2. The control circuit 26 starts supplying the electric power to the plurality of lighting apparatuses 1a after the second timing t2 when the ON manipulation is detected at or after the first timing t1 and before the second timing t2.

Moreover, the control circuits 15 and 26 are not limited to computer systems but may be, for example, an application specific integrated circuit (ASIC), a field programmable gate array (FPGA), or a control integrated circuit (IC).

Each of the plurality of solid-state light-emitting elements included in the light source 1b is not limited to an LED but may be other solid-state light-emitting element such as an organic electro luminescence (OEL) or an inorganic EL. Moreover, each of the light source modules 101 and 102 does not necessarily include a plurality of solid-state light-emitting elements but may include one solid-state light-emitting element. The electrical connection relationship between the plurality of solid-state light-emitting elements may be serial connection, parallel connection, or a connection relationship in combination of the serial connection and the parallel connection.

As described above, an illumination control system 2 of a first aspect is an illumination control system for controlling supply of electric power to a plurality of lighting apparatuses 1a each of which adjusts a lighting state of a corresponding one of a plurality of light sources 1b. The illumination control system 2 includes a manipulation detector 261 and an electric power controller 262. The manipulation detector 261 is configured to detect an ON manipulation by a user and an OFF manipulation by a user. The electric power controller 262 is configured to stop the supply of the electric power to the plurality of lighting apparatuses 1a when the OFF manipulation is detected. The electric power controller 262 is configured to start the supply of the electric power to the plurality of lighting apparatuses 1a when the ON manipulation is detected after detection of the OFF manipulation and before a first timing t1 or when the ON manipulation is detected at or after a second timing t2. The electric power controller 262 is configured to start the supply of the electric power to the plurality of lighting apparatuses 1a at or after the second timing t2 when the ON manipulation is detected at or after the first timing t1 and before the second timing t2. The first timing t1 is a timing at which a threshold time Ta which is predetermined has elapsed since the detection of the OFF manipulation. The second timing t2 is a timing at which a predetermined forced interruption time Tb has elapsed since the first timing t1.

Thus, the illumination control system 2 can change the lighting states of the plurality of light sources 1b collectively to the same state in response to the ON manipulation and the OFF manipulation.

In an illumination control system 2 of a second aspect referring to the first aspect, each of at least two lighting apparatuses 1a of the plurality of lighting apparatuses 1a measures an electric power interruption time which is a time elapsed after the supply of the electric power is stopped. When the supply of the electric power is started before a measured value To of the electric power interruption time reaches a set value of a reference time Ts which is predetermined, each of the at least two lighting apparatuses 1a performs adjustment such that the lighting state of each of the at least two lighting apparatuses 1a at a start of the supply of the electric power is changed from the lighting state of each of the at least two lighting apparatuses 1a before the supply of the electric power is stopped. When the supply of the electric power is started after the measured value To of the electric power interruption time reaches the set value of the reference time Ts, each of the at least two lighting apparatuses 1a performs adjustment such that the lighting state of each of the at least two lighting apparatuses 1a at the start of the supply of the electric power becomes identical to the lighting state of each of the at least two lighting apparatuses 1a before the supply of the electric power is stopped. The threshold time Ta and the predetermined forced interruption time Tb in connection with the electric power controller 262 are set as described below. A value obtained by adding a first correction time α to the threshold time Ta is smaller than a value obtained by subtracting a second correction time β from the reference time Ts, and a value obtained by subtracting the first correction time α from an addition value of the threshold time Ta and the predetermined forced interruption time Tb is larger than a value obtained by adding the second correction time β to the reference time Ts. The first correction time α corresponds to a variation of the measured values To of the electric power interruption time measured by the at least two lighting apparatuses 1a. The second correction time β corresponds to a variation of the set values of the reference time Ts in connection with the at least two lighting apparatuses 1a.

Thus, the measured values To of the electric power interruption time and the set values of the reference time Ts vary between the plurality of lighting apparatuses 1a, results of determination of whether or not the measured values To of the electric power interruption time are larger than or equal to the reference time Ts are the same for the plurality of lighting apparatuses 1a. Thus, the illumination control system 2 can reduce probabilities where both a light source 1b which switches the lighting state and a light source 1b which does not switch the lighting state are present when a user performs the ON manipulation and the OFF manipulation.

In an illumination control system 2 of a third aspect referring to the first or second aspect, the lighting state is a first lighting state. The electric power controller 262 is preferably configured to change a waveform of a voltage of the electric power to provide control contents regarding a second lighting state of each of the plurality of light sources 1b to a corresponding one of the plurality of lighting apparatuses 1a.

Thus, the illumination control system 2 requires neither newly providing wiring for transmitting control signals to instruct the control contents to the lighting apparatuses 1a nor adding a high-cost wireless communication apparatus.

In an illumination control system 2 of a fourth aspect referring to the third aspect, the electric power is alternating-current power, and the plurality of lighting apparatuses 1a are each configured to adjust the second lighting state based on a conduction angle of an alternating-current voltage Va of the electric power. The electric power controller 262 is preferably configured to adjust the conduction angle to a value corresponding to the control contents.

Thus, the illumination control system 2 can provide the control contents to the lighting apparatuses 1a through phase control of the alternating-current voltage Va.

An illumination control system 2 of a fifth aspect referring to the fourth aspect preferably further includes a triac 231 (switching device) disposed in an electric path through which the electric power is supplied to the plurality of lighting apparatuses 1a. The electric power controller 262 is configured to turn on and off the triac 231 to adjust the conduction angle.

Thus, the illumination control system 2 can easily perform the phase control of the alternating-current voltage Va.

An illumination control system 2 of a sixth aspect referring to any one of the first to fifth aspects, the electric power controller 262 is preferably configured to start the supply of the electric power to the plurality of lighting apparatuses 1a at the second timing when the ON manipulation is detected at the first timing. The electric power controller 262 is preferably configured to start the supply of the electric power to the plurality of lighting apparatuses 1a at a third timing when the ON manipulation is detected after the first timing and before the second timing. The third timing is a timing at which an addition time has elapsed since the second timing.

A lighting system B1 of a seventh aspect includes the illumination control system 2 referring to any one of the first to sixth aspects and a plurality of lighting apparatuses 1a each of which adjusts a lighting state of a corresponding one of a plurality of light sources 1b.

Thus, the lighting system B1 can change the lighting states of the plurality of light sources 1b collectively to the same state in response to the ON manipulation and the OFF manipulation.

A lighting system B1 of an eighth aspect includes the illumination control system 2 of the first aspect and a plurality of lighting apparatuses 1a each of which adjusts a lighting state of a corresponding one of a plurality of light sources 1b. Each of at least two lighting apparatuses of the plurality of lighting apparatuses 1a measures an electric power interruption time which is a time elapsed after the supply of the electric power is stopped. When the supply of the electric power is started before a measured value To of the electric power interruption time reaches a set value of a reference time Ts which is predetermined, each of the at least two lighting apparatuses 1a performs adjustment such that the lighting state of each of the at least two lighting apparatuses 1a at a start of the supply of the electric power is changed from the lighting state of each of the at least two lighting apparatuses 1a before the supply of the electric power is stopped. When the supply of the electric power is started after the measured value To of the electric power interruption time reaches the set value of the reference time Ts, each of the at least two lighting apparatuses 1a performs adjustment such that the lighting state of each of the at least two lighting apparatuses 1a at the start of the supply of the electric power becomes identical to the lighting state of each of the at least two lighting apparatuses 1a before the supply of the electric power is stopped. The threshold time Ta and the predetermined forced interruption time Tb in connection with the electric power controller 262 are set as described below. A value obtained by adding a first correction time α to the threshold time Ta is smaller than a value obtained by subtracting a second correction time β from the reference time Ts, and a value obtained by subtracting the first correction time α from an addition value of the threshold time Ta and the predetermined forced interruption time Tb is larger than a value obtained by adding the second correction time β to the reference time Ts. The first correction time α corresponds to a variation of the measured values To of the electric power interruption time measured by the at least two lighting apparatuses 1a. The second correction time β corresponds to a variation of the set values of the reference time Ts in connection with the at least two lighting apparatuses 1a.

Thus, the measured values To of the electric power interruption time and the set values of the reference time Ts vary between the plurality of lighting apparatuses 1a, results of determination of whether or not the measured values To of the electric power interruption time are larger than or equal to the reference time Ts is the same for the plurality of lighting apparatuses 1a. Thus, the lighting system B1 can reduce probabilities where both a light source 1b which switches the lighting state and a light source 1b which does not switch the lighting state are present when a user performs the ON manipulation and the OFF manipulation.

In a lighting system B1 of a ninth aspect referring to the eighth aspect, the electric power is alternating-current power. Each of the at least two lighting apparatuses 1a of the plurality of lighting apparatuses 1a preferably includes a control circuit 15. The control circuit 15 is configured to, when succeeding in detecting a zero cross of a control signal (second control signal) obtained by rectifying an alternating-current voltage Va of the electric power, determine that the illumination control system 2 is in an electric power supply state of supplying the electric power. The control circuit 15 is configured to, when failing to detect the zero cross, determine that the illumination control system 2 is in an electric power interruption state of interrupting the supply of the electric power.

A lighting system B1 of tenth aspect referring to any one of the seventh to ninth aspects, the lighting state preferably corresponds to a color state, a dimming level, or a fade time of a corresponding one of the plurality of light sources 1b.

In a lighting system B1 of an eleventh aspect referring to any one of the seventh to ninth aspects, each of the plurality of light sources 1b includes light source modules 101 and 102. The lighting state preferably indicates which one or both of the light source modulus 101 and 102 are switched to be lit.

An illumination system A1 of a twelfth aspect includes the lighting system B1 referring to any one of the seventh to eleventh aspects and a plurality of light sources 1b.

Thus, the illumination system A1 can change the lighting states of the plurality of light sources 1b collectively to the same state in response to the ON manipulation and the OFF manipulation.

A non-transitory recording medium of a thirteenth aspect records a program which causes a computer system to execute a manipulation detection step S1 and an electric power controlling step S2. The manipulation detection step S1 is a step of detecting an ON manipulation by a user and an OFF manipulation by a user. The electric power controlling step S2 includes stopping supply of electric power to a plurality of lighting apparatuses 1a when the OFF manipulation is detected. The electric power controlling step S2 includes starting the supply of the electric power to the plurality of lighting apparatuses 1a when the ON manipulation is detected after detection of the OFF manipulation and before a first timing t1, or when the ON manipulation is detected at or after a second timing t2. The electric power controlling step S2 includes starting the supply of the electric power to the plurality of lighting apparatuses 1a at or after the second timing t2 when the ON manipulation is detected at or after the first timing t1 and before the second timing t2. The first timing t1 is a timing at which a threshold time Ta which is predetermined has elapsed since the detection of the OFF manipulation. The second timing t2 is a timing at which a predetermined forced interruption time Tb has elapsed since the first timing t1.

Thus, the non-transitory recording medium can change the lighting states of the plurality of light sources 1b collectively to the same state in response to the ON manipulation and the OFF manipulation.

An illumination control method of a fourteenth aspect is an illumination control method for controlling supply of electric power to a plurality of lighting apparatuses 1a each of which adjusts a lighting state of a corresponding one of a plurality of light sources. The illumination control method includes a manipulation detection step S1 and an electric power controlling step S2. The manipulation detection step S1 is a step of detecting an ON manipulation by a user and an OFF manipulation by a user. The electric power controlling step S2 includes stopping the supply of the electric power to the plurality of lighting apparatuses 1a when the OFF manipulation is detected. The electric power controlling step S2 includes starting the supply of the electric power to the plurality of lighting apparatuses 1a when the ON manipulation is detected after detection of the OFF manipulation and before a first timing t1, or when the ON manipulation is detected at or after a second timing t2. The electric power controlling step S2 includes starting the supply of the electric power to the plurality of lighting apparatuses 1a at or after the second timing t2 when the ON manipulation is detected at or after the first timing t1 and before the second timing t2. The first timing t1 is a timing at which a threshold time Ta which is predetermined has elapsed since the detection of the OFF manipulation. The second timing t2 is a timing at which a predetermined forced interruption time Tb has elapsed since the first timing t1.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. An illumination control system for controlling supply of electric power to a plurality of lighting apparatuses each of which adjusts a lighting state of a corresponding one of a plurality of light sources, the illumination control system comprising:
   a manipulation detector; and
   an electric power controller,
   the manipulation detector being configured to detect an ON manipulation by a user and an OFF manipulation by a user,
   the electric power controller being configured to
      stop the supply of the electric power to the plurality of lighting apparatuses when the OFF manipulation is detected,
      start the supply of the electric power to the plurality of lighting apparatuses when the ON manipulation is detected after detection of the OFF manipulation and before a first timing, or when the ON manipulation is detected at or after a second timing, and
      start the supply of the electric power to the plurality of lighting apparatuses at or after the second timing when the ON manipulation is detected at or after the first timing and before the second timing,
   the first timing being a timing at which a threshold time which is predetermined has elapsed since the detection of the OFF manipulation,
   the second timing being a timing at which a predetermined forced interruption time has elapsed since the first timing.

2. The illumination control system according to claim 1, wherein
   each of at least two lighting apparatuses of the plurality of lighting apparatuses measures an electric power interruption time which is a time elapsed after the supply of the electric power is stopped;
   when the supply of the electric power is started before a measured value of the electric power interruption time reaches a set value of a reference time which is predetermined, each of the at least two lighting apparatuses performs adjustment such that the lighting state of each of the at least two lighting apparatuses at a start of the supply of the electric power is changed from the lighting state of each of the at least two lighting apparatuses before the supply of the electric power is stopped;
   and when the supply of the electric power is started after the measured value of the electric power interruption time reaches the set value of the reference time, each of the at least two lighting apparatuses performs adjustment such that the lighting state of each of the at least two lighting apparatuses at the start of the supply of the electric power becomes identical to the lighting state of each of the at least two lighting apparatuses before the supply of the electric power is stopped, and
   wherein the threshold time and the predetermined forced interruption time in connection with the electric power controller are set such that
      a value obtained by adding a first correction time to the threshold time is smaller than a value obtained by subtracting a second correction time from the reference time, and
      a value obtained by subtracting the first correction time from an addition value of the threshold time and the predetermined forced interruption time is larger than a value obtained by adding the second correction time to the reference time,
   the first correction time corresponds to a variation of the measured values of the electric power interruption time measured by the at least two lighting apparatuses, and
   the second correction time corresponds to a variation of the set values of the reference time in connection with the at least two lighting apparatuses.

3. The illumination control system according to claim 1, wherein
   the lighting state is a first lighting state, and
   the electric power controller is configured to change a waveform of a voltage of the electric power to provide control contents regarding a second lighting state of each of the plurality of light sources to a corresponding one of the plurality of lighting apparatuses.

4. The illumination control system according to claim 3, wherein
   the electric power is alternating-current power,
   the plurality of lighting apparatuses are each configured to adjust the second lighting state based on a conduction angle of an alternating-current voltage of the electric power, and
   the electric power controller is configured to adjust the conduction angle to a value corresponding to the control contents.

5. The illumination control system according to claim 4, further comprising a switching device disposed in an electric path through which the electric power is supplied to the plurality of lighting apparatuses, wherein
   the electric power controller is configured to turn on and off the switching device to adjust the conduction angle.

6. The illumination control system according to claim 1, wherein
   the electric power controller is configured to
      start the supply of the electric power to the plurality of lighting apparatuses at the second timing when the ON manipulation is detected at the first timing, and
      start the supply of the electric power to the plurality of lighting apparatuses at a third timing when the ON manipulation is detected after the first timing and before the second timing, the third timing being a timing at which an addition time has elapsed since the second timing.

7. A lighting system, comprising:
   the illumination control system according to claim 1; and
   a plurality of lighting apparatuses each of which adjusts a lighting state of a corresponding one of a plurality of light sources.

8. A lighting system, comprising:
   the illumination control system according to claim 1; and
   a plurality of lighting apparatuses each of which adjusts a lighting state of a corresponding one of a plurality of light sources,
   each of at least two lighting apparatuses of the plurality of lighting apparatuses measuring an electric power interruption time which is a time elapsed after the supply of the electric power is stopped;
   when the supply of the electric power is started before a measured value of the electric power interruption time reaches a set value of a reference time which is predetermined, each of the at least two lighting apparatuses performing adjustment such that the lighting state of each of the at least two lighting apparatuses at a start of the supply of the electric power is changed from the lighting state of each of the at least two lighting apparatuses before the supply of the electric power is stopped;
   and when the supply of the electric power is started after the measured value of the electric power interruption time reaches the set value of the reference time, each of the at least two lighting apparatuses performing adjustment such that the lighting state of each of the at least two lighting apparatuses at the start of the supply of the electric power becomes identical to the lighting state of each of the at least two lighting apparatuses before the supply of the electric power is stopped,
   the threshold time and the predetermined forced interruption time in connection with the electric power controller being set such that
      a value obtained by adding a first correction time to the threshold time is smaller than a value obtained by subtracting a second correction time from the reference time, and
      a value obtained by subtracting the first correction time from an addition value of the threshold time and the predetermined forced interruption time is larger than a value obtained by adding the second correction time to the reference time,
   the first correction time corresponding to a variation of the measured values of the electric power interruption time measured by the at least two lighting apparatuses,
   the second correction time corresponding to a variation of the set values of the reference time in connection with the at least two lighting apparatuses.

9. The lighting system according to claim 8, wherein
   the electric power is alternating-current power, each of the at least two lighting apparatuses of the plurality of lighting apparatuses includes a control circuit, the control circuit is configured to, when succeeding in detecting a zero cross of a control signal obtained by rectifying an alternating-current voltage of the electric power, determine that the illumination control system is in an electric power supply state of supplying the electric power, and the control circuit is configured to, when failing to detect the zero cross, determine that the illumination control system is in an electric power interruption state of interrupting the supply of the electric power.

10. The lighting system according to claim 7, wherein the lighting state corresponds to a color state, a dimming level, or a fade time of a corresponding one of the plurality of light sources.

11. The lighting system according to claim 8, wherein the lighting state corresponds to a color state, a dimming level, or a fade time of a corresponding one of the plurality of light sources.

12. The lighting system according to claim 7, wherein each of the plurality of light sources includes a plurality of light source modules, and the lighting state indicates which one or more of the plurality of light sources are switched to be lit.

13. The lighting system according to claim 8, wherein the light source includes a plurality of light source modules, and the lighting state indicates which one or more of the plurality of light sources are switched to be lit.

14. An illumination system, comprising:
the lighting system according to claim 7; and
a plurality of light sources.

15. An illumination system, comprising:
the lighting system according to claim 8; and
a plurality of light sources.

16. An illumination control method for controlling supply of electric power to a plurality of lighting apparatuses each of which adjusts a lighting state of a corresponding one of a plurality of light sources, the illumination control method comprising:

a manipulation detection step of detecting an ON manipulation by a user and an OFF manipulation by a user, an electric power controlling step of stopping the supply of the electric power to the plurality of lighting apparatuses when the OFF manipulation is detected, starting the supply of the electric power to the plurality of lighting apparatuses when the ON manipulation is detected after detection of the OFF manipulation and before a first timing, or when the ON manipulation is detected at or after a second timing, and starting the supply of the electric power to the plurality of lighting apparatuses at or after the second timing when the ON manipulation is detected at or after the first timing and before the second timing, the first timing being a timing at which a threshold time which is predetermined has elapsed since the detection of the OFF manipulation, the second timing being a timing at which a predetermined forced interruption time has elapsed since the first timing.

17. A non-transitory recording medium having a program stored thereon which causes a computer system to execute the illumination control method of claim 16.

* * * * *